Figure 1:
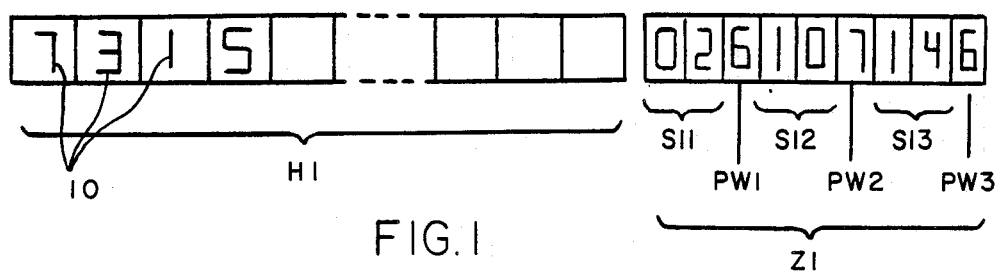

United States Patent [19]

Stockburger et al.

[11] Patent Number: 4,705,938

[45] Date of Patent: * Nov. 10, 1987

[54] METHOD OF SECURING DATA ON A DATA SUPPORT

[76] Inventors: Hermann Stockburger, Kirnachweg 7, D-7742 St. Georgen; Hans-Georg Winderlich, Niedere Str. 36, D-7730 Villingen, both of Fed. Rep. of Germany

[ * ] Notice: The portion of the term of this patent subsequent to Sep. 4, 2001 has been disclaimed.

[21] Appl. No.: 621,808

[22] Filed: Jun. 18, 1984

Related U.S. Application Data

[63] Continuation of Ser. No. 509,330, Jun. 30, 1983, Pat. No. 4,469,937, which is a continuation of Ser. No. 261,196, May 8, 1981, abandoned.

[30] Foreign Application Priority Data

Sep. 8, 1979 [DE] Fed. Rep. of Germany ....... 2936409

[51] Int. Cl.$^4$ ............................................. G06K 7/12
[52] U.S. Cl. ................................. 235/435; 235/469; 340/825.34
[58] Field of Search ...................... 235/435, 380, 469; 340/825.34; 356/71

[56] References Cited

U.S. PATENT DOCUMENTS

| 4,034,211 | 7/1977 | Horst et al. | 356/71 |
| 4,094,462 | 6/1978 | Moschner | 235/380 |
| 4,469,937 | 9/1984 | Stockburger et al. | 340/825.34 |

*Primary Examiner*—Donald J. Yusko
*Attorney, Agent, or Firm*—Donald Brown

[57] ABSTRACT

A method of securing data recorded on a data support and a device for performing the method are disclosed. In addition to the basic information contained in the data recorded on the data support, for generating an additional security code, selected individual properties of the recorded data are used which differ from each other as regards their physical and/or chemical properties. In one embodiment, individual characters imprinted on the data support are used which differ from each other with respect to contrast or half-tone density in a manner unperceivable to human sight, but easily detectable by a detector or an automatic reading apparatus. Authenticity of the data support or data is determined by a security code contained in the specific physical or chemical properties of the selected individual characters. The method prevents from duplication or falsifying of data supports.

5 Claims, 4 Drawing Figures

METHOD OF SECURING DATA ON A DATA SUPPORT

This application is a continuation of Ser. No. 509,330 filed June 30, 1983, now U.S. Pat. No. 4,469,937, which is a continuation of Ser. No. 261,196 filed May 8, 1981, now abandoned.

The invention relates to a method of securing data which are recorded on a data support in a manner to be automatically readable and in the form of a plurality of individual characters, and to a device for applying the data of a data support, as well as a device for reading the data.

Securing data against unauthorized imitation is of increasing importance. For many applications of data supports imprinted for automatic reading it is essential to prevent the production of duplication or to recognize the same. Examples are bank notes, papers of value, identity papers, number plates of motor vehicles, identification of items, etc. To this end, determined data are imprinted or otherwise applied on a data support which may be secured on in item. To prevent imitation of the data support and eventually the use of similar items for non-authorized characterization, security precautions should be taken. Thus, it is known to interdigitate the data of the data support in accordance with a predetermined rule so that the individual characters are taken out of their original relation and recorded in orderless form. Further, it is known to provide a method of checking the recorded information as to their authenticity.

Although the known methods assure that the falsifier will be unable to effect the marking of a data support in his own judgement, it is not prevented that the recording of an original data support may be transferred onto another data support by duplication.

The invention aims at providing a method of the type mentioned at the outset, by which the transfer of data from a marked original data support onto another data support is rendered more difficult.

To solve this problem, in accordance with the invention, selected individual characters are detected with respect to their physical and/or chemical properties.

In accordance with conventional recording methods, the individual characters applied in such a manner that they are not different from each other with respect to colour density or the density of magnetic fields. The individual characters merely distinguish from each other by the code indicating their signification. In case of writing characters, the signification content is defined by the shape of the individual characters, in case of a conventional dash-code, however, by the width of the dashes or by the succession of individual dashes of different width. In accordance with the invention, an additonal criterion of distinction is provided which e.g. consists of the detection of different contrast values. Thus, when a data support is imprinted, selected individual characters may be imprinted with less density than other individual characters. Upon verification of the data support as to authenticity, the verification device will only determine authenticity in case the data at the predetermined positions have the required physical and/or chemical properties, for example a predetermined half-tone. Printing contrast variations in the order of 20 to 30% cannot be recognized by the human eye, but well distinguished by automatic detection. A code applied by imprinting with different half-tones or colour densities of individual characters with respect to others, will appear as being uniform to the observers, although a machine reading the record will be able to detect the differences. Upon photographic reproduction or copying a printing pattern of this kind, these differences will also be lost, so that the transfer of a printing pattern onto another data support would involve major difficulties. Further, the printing background of the data support may be coloured and may be different from one item to another. Further, a pictured background may be provided. Due to spectral differences, different analog signals may be read the levels and positions of which are detected and used as an additional information.

In similar manner, magnetic signals may be distinguished by varying magnetic characteristics and detecting them by determining their levels.

Preferably, the selected individual characters distinguish from the other individual characters in non-visible manner. The distinction may e.g. be based on different colour densities or different contrast with respect to the background.

In accordance with an advantageous embodiment of the invention, the data recorded on the data support comprise additional indications with respect to those individual characters which are the selected individual characters.

When the data are applied on the data support, a predetermined program may be used to determine those individual characters to be imprinted as "the selected individual characters", e.g. having half-tone densitites or other properties differing from those of the other individual characters. Corresponding indications used for identification of the selected individual characters are imprinted adjacent thereto as normal data on the data support. By evaluation or processing, those individual characters may be determined which distinguish from the other individual characters by their physical and/or chemical properties, in order to recover the additional information. This additional information may be converted into digital shape and compared with corresponding additional indications on the data support, and authenticity of the data support is only determined in case of correspondence.

A further possibility is to imprint a data support which is e.g. provided with a half-tone pattern, with the data to be applied and to detect the imprint subsequently by using a reading device which determines the contrast of the individual characters with respect to the associated background. By providing an additional imprint, information with respect to the contrast of different individual characters may be recorded. A data support characterized and imprinted in this manner is substantially safe against duplication, particularly in case the stock material of which the data supports are formed is provided with a half-tone pattern of random distribution differing from one item to another. Even in case a falsifier would be successful in obtaining the stock material, he would be unable to transfer the information from the original data support onto the stock material without knowing the type of specific encoding and contrast evaluation of the individual characters.

An embodiment of the invention will hereunder be disclosed in detail with reference to the drawings.

Figure 2:
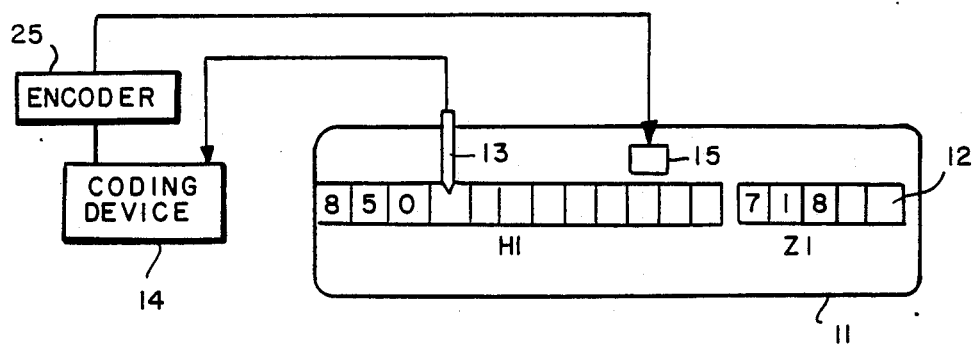
Figure 3:
Figure 4:
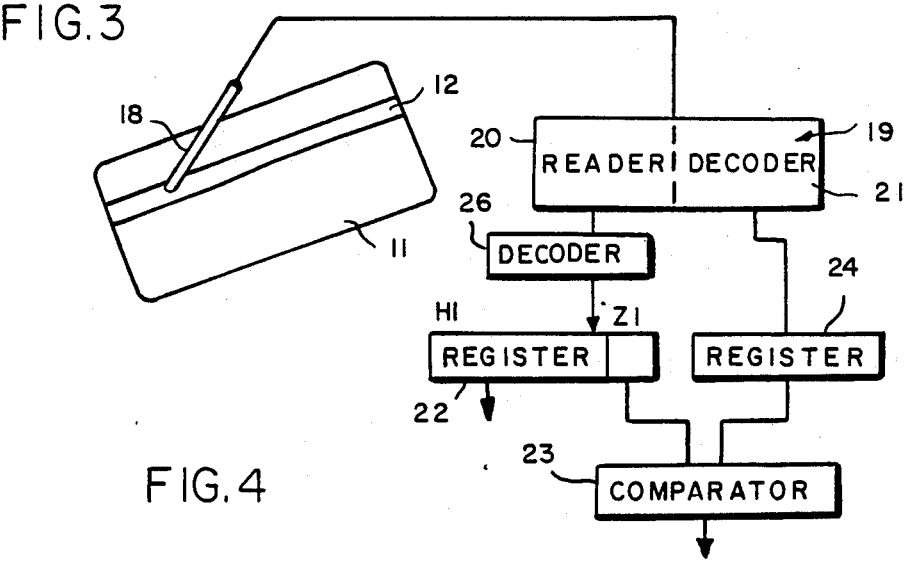

FIG. 1 schematically shows an information track of a data support imprinted with automatically readable characters;

FIG. 2 schematically shows a device for recording an additional information on the data support;

FIG. 3 shows different kinds of characterization of selected individual characters; and FIG. 4 shows a block diagram of a reading device for detecting the additional information.

In FIG. 1, the information track of a data support is shown. The individual characters 10 are contained in a sequence of the information track in the form of automatically readable characters, one individual field being provided for each character. The basic information HI may be encoded order interdigitated by conventional methods to prevent their signification from being determined without difficulty. The basic information HI is followed by an additional information ZI which also consists of automatically readable numbers.

The numbers of the basic information slightly differ from each other as regards their density or contrast with respect to the background. These differences, however, are unperceivable by human sight, but can be recognized upon automatic detection of the writing characters. The additional information ZI contains corresponding indications with respect to the selected writing characters and the densities of their half-tone. In the present case, three writing characters are the "selected characters". These are the second, tenth and fourteenth writing character. The number indicates the position of the respective writing character within the basic information HI. The additional informatio ZI contains the indications with respect to the positions taken by the selected writing characters within the basic informaiton HI. In the present case, position 1 St 1 is the second position, as indicated by the numbers 02. At this position, in the present embodiment of FIG. 1, the number "2" is found which is suitable for automatic reading. The second selected position St 2 is found at position 10, while the third selected position St 3 ist found at position 14 within the basic information HI. In addition to the positions where the selected individual characters or writing characters are located, the additional information ZI contains an indication of the level of the respective writing character, i.e. the half-tone density with which the writing characters are imprinted. The level PW1 of the writing character at the second position is 6, the level PW2 of the writing character in the tenth position is 10 and the level PW3 of the writing character at the fourteenth position is 6.

Upon evaluation or processing of the data support, a reading device will determine the half-tones of the selected writing characters of the basic information HI and compare the same with the levels PW1, PW2 and PW3. Authenticity of the recorded information consisting of the basic information HI and the additional information ZI, will only be determined in case of correspondence.

FIG. 1 schematically shows a device for applying the additional information ZI. That portion of the information track 12 of a data support 11 intended for the basic information HI is already marked with the basic information HI, whereby e.g. the half-tones of the individual writing characters may differ from each other. The marking is detected by a reading head 13 supplying a signal corresponding to the colour density or colour contrast with respect to the background for each writing character to a coding device 14. In the coding device 14, the signal corresponding to the half-tone is converted into a digital signal. Further, within the coding device 14, the positions scanned by the reading head 13 are continuously counted. The coding device 14 generates the writing characters St1, St2, St3 for characterization of the selected positions or writing characters, and additionally the levels PW1, PW2 and PW3. It controls an encoder 25 performing an interdigitation or redistribution of the writing characters in accordance with predetermined rules, and a writing head 15 imprinting the additional information ZI on the data support 11 after the basic information HI.

As the additional information ZI, either the contrast variations which are anyway encountered upon recording of the basic information HI, may be detected, as with the above disclosed embodiment, or contrast variation or different half tones or spectral distributions may be generated on purpose. For the sake of illustration, FIG. 3 shows a writing character 16 in the conventional dash code in which each writing character consists of a combination of wider or narrower dashes. The contrast of the dashes of the writing characters 16 with reference to the background may be varied on purpose or at random.

In case of the characer 17 in FIG. 3, the wider dashes are formed of a plurality of adjacent narrow separate lines. This will allow the half-tone of the writing character to be affected by selecting the dash spacing of the narrow separate lines in corresponding manner. The writing character 17 further provides another way of detection by using two reading heads of which the first has an optical resolution sufficient to recognize the separate lines, whereas the second reading head has reduced resolution and will merely determine the half-tone. Writing characters of the kind indicated at 16 and 17 may alternate within one recording, the writing characters 17 being e.g. the "selected writing characters".

FIG. 4 shows a block diagram of a reading device for reading the information track 12 of a data support 11. A reading head 18 scans the information track 12 and delivers signals to a device 19 having a reading portion 20 and a measurement portion 22. From the reading portion 20, the total information of the basic information HI and the additional information ZI will be transferred, after decoding in a decoder 26 in which the correct succession of the writing characters is restored, to a register 22 from which the basic information HI may be read. That portion of the register 22 intended for the additional information ZI is connected with an input of a comparator 23.

In the measurement portion 21, the levels of the selected characters are determined and converted into digital values. In this manner, the additional information ZI is recovered by measurement of brightness and introduced in digital form into a second register 24. The output of the register 24 is connected with the second input of the comparator 23. An authentic data support is determined in case coincidence of the read additional information ZI and the measured additional information stored in the register 24, is determined in the comparator 23.

What is claimed is:

1. A method of preventing the generation of a duplicate data support having characters which are the same in significance and physical properties as the characters of a data support comprising the steps of (a) recording a plurality of data information characters of a predetermined significance on said data support with at least some of said data information characters additionally having different physical properties, (b) measuring a physical property of selected ones of said data information characters having different physical properties and (c) recording checking characters representative of the measured physical property of at least some of said selected ones of said data information characters on said data support whereby duplicating the significance of the data characters of said data support would not result in the generation of a duplicate data support having identical characters both in significance and physical properties of the characters of the data support being duplicated.

2. The method of claim 1 in which step (a) comprises recording selected ones of said data information characters with different density or contrast with respect to the background of the data support.

3. The method of claim 1 in which the differences physical properties of the data information characters are not visible to the human eye.

4. The method of claim 1 in which the data information characters are numericals.

5. The method of claim 1 in which the data information characters are in the form of bars.

* * * * *